United States Patent [19]

Takeuchi

[11] Patent Number: 5,374,183
[45] Date of Patent: Dec. 20, 1994

[54] MOLDING APPARATUS WITH ROTATABLE SPRUE BUSHING

[75] Inventor: Hiroshi Takeuchi, Tokyo, Japan
[73] Assignee: Shinkoh Selubic Co., Ltd., Tokyo, Japan
[21] Appl. No.: 974,875
[22] Filed: Nov. 12, 1992
[30] Foreign Application Priority Data
  Nov. 12, 1991 [JP] Japan ................... 3-295976
[51] Int. Cl.⁵ ............... B29C 45/27; B29C 45/56
[52] U.S. Cl. ................... 425/567; 425/568; 425/574; 264/328.12
[58] Field of Search ........... 264/328.1, 328.9, 328.11, 264/328.12; 425/568, 567, 574, 582, 572
[56] References Cited

U.S. PATENT DOCUMENTS

| 3,356,242 | 12/1967 | Cleereman | 264/328.12 |
| 3,940,226 | 2/1976 | Verhoeven | 425/574 |
| 4,560,342 | 12/1985 | Ishida et al. | 264/328.12 |
| 5,017,127 | 5/1991 | Majerus et al. | 425/568 |
| 5,221,538 | 6/1993 | Gasami et al. | 425/574 |

FOREIGN PATENT DOCUMENTS

| 2306366 | 9/1974 | Germany | 425/567 |
| 17-17582 | 9/1942 | Japan | 425/567 |

Primary Examiner—Jill L. Heitbrink
Attorney, Agent, or Firm—Jacobson, Price, Holman & Stern

[57] ABSTRACT

A molding apparatus includes a rotatable sprue bushing mounted in mold halves and formed with a sprue therein for introducing material into a mold cavity. The sprue communicates with a gate, as an outlet of the sprue, located at a position radially displaced from a center axis of the sprue bushing. Since the sprue bushing is rotated by a ring gear driven by a motor provided in or beside the mold half, the gate of the sprue rotates around the center axis when molten resin is introduced into the mold cavity, and therefore, the molding apparatus can eliminate localization of stress in molded articles, thereby improving quality of the molded articles.

8 Claims, 5 Drawing Sheets

MOLDING APPARATUS WITH ROTATABLE SPRUE BUSHING

BACKGROUND OF THE INVENTION

1. Field of the Invention

This invention relates to a molding apparatus for molding articles by introducing molten resin into its mold cavity.

2. Description of Related Art

In a typical process of injection molding, molten resin introduced through a gate of a mold flows along an inner face of a mold cavity. When the mold is formed with a single gate, the molten resin flows from the gate, as a center, radially. Depending on the mold structure, the stress of a molded article is localized near the gate, and the material density of the molded article decreases as its position approaches to the periphery of the molded article. If the mold has a plate-shaped cavity, such as for a gear, and also has a center hole, the gate of the mold can not be positioned at the center of the cavity. In FIG. 1, a mold for producing a gear is shown. Since the gear has a center hole 61, three gates 62a, 62b, and 62c, which are equally spaced with each other, introduce molten resin into the cavity.

The localized stress in the molded articles affects the quality of the molded article. When the plate-shaped mold cavity is used for optical disc recording medium and the like, stress in the molded articles causes disunity of birefringent ratio, thereby causing failure of the molded articles.

In FIG. 1, since molten resin is filled from each of gates 62a, 62b, and 62c, each of areas 63a, 63b, and 63c extending radially from the corresponding gates has high material density. In areas 64d, 64e, and 64f outside of the areas 63a, 63b, and 63c, however, molten resin is filled so that material density of those areas is inevitably low. In order to reduce the low density areas 64d, 64e, and 64f, a multiple gate may be effective, but the multiple gate puts the design of the mold under constraints.

When molten resin is introduced into a plate-shaped cavity, such as for an optical lens, through a single gate located at the outer periphery of the cavity, weld lines tend to occur at the area at which edges of molten material flows which are split once are joined again.

By analyses of filling of molten resin into the mold cavity, when molten resin flows from the gate into the cavity, the molten resin starts to flow from a mold face to which the molten resin firstly contacts. The molten resin spreads from the mold face to which the molten resin firstly contacts, as a center, to other section of the mold face. In other words, since the gate is fixed, the molten resin of each injection dose not always flow on the same mold face. Therefore, disunity of the molded articles occurs.

SUMMARY OF THE INVENTION

It is an object of the present invention to provide a molding apparatus which avoids localization of stress in molded articles and thereby eliminates baneful influence due to the localization of stress.

It is another object of the present invention to provide a molding apparatus which reduces weld lines on the molded articles.

It is a further object of the present invention to provide a molding apparatus which avoids restriction of a mold design and of an article shape due to the position of a gate thereof.

The foregoing objects of the present invention are accomplished by providing a molding apparatus including a pair of mold halves capable of opening and closing, a rotary member, or a rotatable sprue bushing, mounted in one of the mold halves, and drive means for driving the rotatable sprue bushing. The sprue bushing is formed with a passage, or a sprue, for flowing molten resin and introducing the molten resin into a mold cavity. The sprue has an inlet located on a center axis of rotation of the sprue bushing and an outlet, or a gate, located at a position radially displaced from the center axis. By rotation of the sprue bushing during filling of molten resin, the gate of the sprue rotates around the center axis, so that the position through which the molten resin is introduced into the mold cavity moves to reduce the localization of stress around the gate.

According to an embodiment of the invention, the sprue includes a curved portion for guiding molten resin radially outward of the center axis. The drive means includes driven and drive gears to rotate the sprue bushing. These gears are provided within the one of the mold halves at which the sprue bushing is rotatablly mounted. A motor for driving the drive gear is installed within or at the side of the one of the mold halves. An intermediate gear for transmitting drive power of the motor is provided within the one of the mold halves, if necessary.

To produce optical articles, such as optical lenses, the gate of the sprue is arranged to open at the edge of the mold face of the sprue bushing. Since the gate moves along the whole circumference of the mold cavity, weld lines in the molded articles are obviated.

BRIEF DESCRIPTION OF THE DRAWINGS

The above and other objects and features of the present invention will be apparent to those skilled in the art from the following description of a preferred embodiment thereof when considered in conjunction with the accompanying drawings, in which.

DETAILED DESCRIPTION OF THE PREFERRED EMBODIMENT

Figure 1:
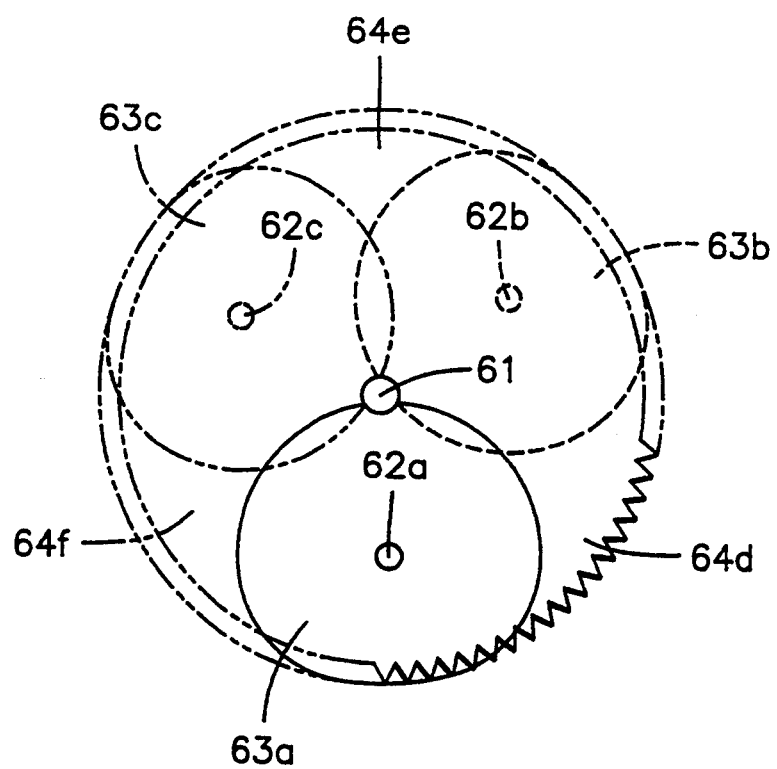
FIG. 1 is a diagram showing a mold for a gear of a conventional mold apparatus.
Figure 2:
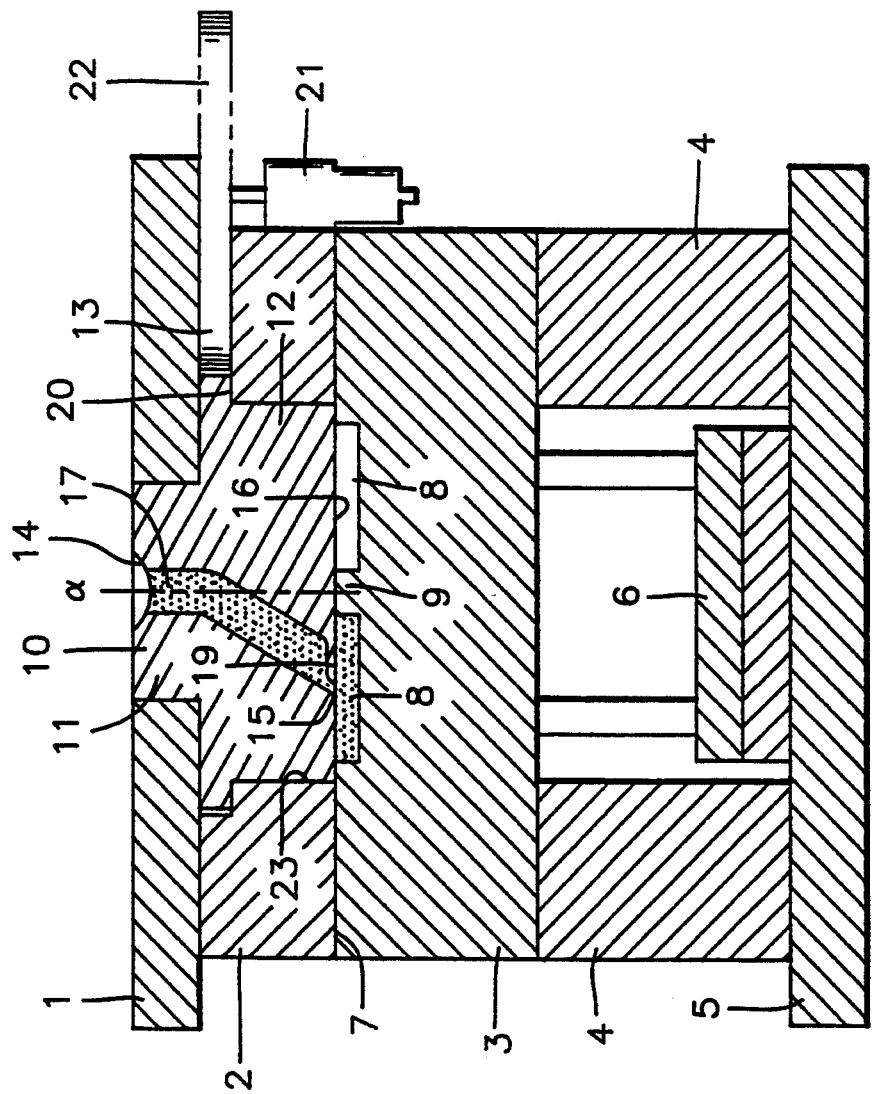
FIGS. 2 and 3 are cross-sections showing a mold apparatus according to the present invention.

Referring to the drawings in detail and, in particular, to FIGS. 2 to 5, a molding apparatus for molding plate-shaped articles according to the present invention is shown. The molding apparatus is secured to an injection molding machine, which is able to inject molten resin into the mold apparatus. The mold apparatus includes a pair of platens 1, 5 each having a plate shape and mechanical rigidity. The platen 1 is a stationary platen provided on the side of an injection unit, not shown, of the injection molding machine. The platen 5 is a movable platen fixedly connected to an end of a clamp cylinder, not shown, for opening and closing the mold apparatus. A stationary mold half 2 and a movable mold half 3 are provided between the stationary platen 1 and the movable platen 5. The stationary mold half 2 is fastened directly to the stationary platen 1. The movable mold half 3 is secured to the movable platen 5 by a pair of spacer blocks 4. The stationary mold half 2 and the movable mold half 3 contact with each other when closed so as to define the mold cavity 8 located between the mold halves 2, 3 by force of the clamp cylinder, and separate at a parting line 7 when opened. The movable mold half 3 is formed with an ejector 6 provided between the spacer blocks 4.

The mold cavity 8 is a plate-shaped hollow for molding gears as molded articles. A boss 9 for forming a center hole of the gears is formed at a center of the mold cavity 8 so as to extend from the movable mold half 3 and so as to project through to the stationary mold half 2.

A mold face 16 of the mold cavity 8 on the side of the injection unit is formed by a sprue bushing 10, as a rotary member, mounted in the stationary mold half 2 and platen 1. The sprue bushing 10 is fitted in a bore 23 so as to be rotatable. The bore 23 is located at the center of the stationary mold half 2 and platen 1, and extends so as to penetrate the stationary mold half 2 and platen 1. The sprue bushing 10 is formed in a cylindrical shape coupled with two different radius portions, a small radius portion 11 and a large radius portion 12. The small radius portion 11 is formed on the side of the injection unit, so that an end face of the small radius portion 11 contacts a tip of a nozzle of the injection unit during operation. The stationary platen 1 supports the small radius portion 11. The end face of the small radius portion 11 has an indentation for allowing the nozzle to be positioned. The large radius portion 12 has a larger diameter than the small radius portion 11, and the size of the large radius portion 12 covers the opening of the mold cavity 8. The stationary mold half 2 supports the large radius portion 12. The small radius portion 11 and the large radius portion 12 fit into the bore 23, which has a stepped inner surface extending through the stationary mold half 2 and the stationary platen 1.

A ring gear 13, or a driven gear, is secured to the circumferential periphery of the large radius portion 12 on a side of the small radius portion 11. The ring gear 13, projecting like a brim from the sprue bushing 10, meshes a drive gear 22, which is provided in a space 20 between the stationary mold half 2 and the stationary platen 1. A shaft of the drive gear 22 is connected to an electromagnetic motor 21, which is secured to a side of the stationary mold half 2. Accordingly, when the motor 21 operates, the drive gear 22 is rotated, so that the ring gear 13 is driven and thereby rotates the sprue bushing 10. To reduce friction between the ring gear 13 and the stationary mold half 2 or the stationary platen 1, a bearing or the like can be arranged around the ring gear 13. In addition, a belt, a chain, or the like can be used in lieu of the gears 13, 22.

Within the sprue bushing 10, a passage, or a sprue 17, is formed to introduce molten resin into the mold cavity 8. An inlet 14 of the sprue 17 is opened at a deep portion of the indentation for the nozzle, and is located on a center axis $\alpha$ of the sprue bushing 10. The sprue 17 extends in the sprue bushing 10 from the inlet 14 along the center axis $\alpha$, and then curves so as to shift from the center axis $\alpha$ gradually. An outlet, or a gate 15, of the sprue 17 is arranged at the mold face 16 of the sprue bushing 10. The gate 15 is opened at a position spaced by a predetermined distance W from the center axis $\alpha$. It is desirable that the predetermined distance W is determined so as to satisfy conditions from a cavity structure and injecting materials.

The gate 15 is made as a narrow opening oriented radially outward of the center axis $\alpha$. In order to form the narrow opening, the wall of the sprue 17 on a side of the center axis $\alpha$ is curved so as to form a curved portion 19. Therefore, the gate 15 of the sprue 17 is located at a far side from the center axis $\alpha$, and the curved portion 19 allows molten resin to flow radially outward of the center axis $\alpha$.

Figure 3:
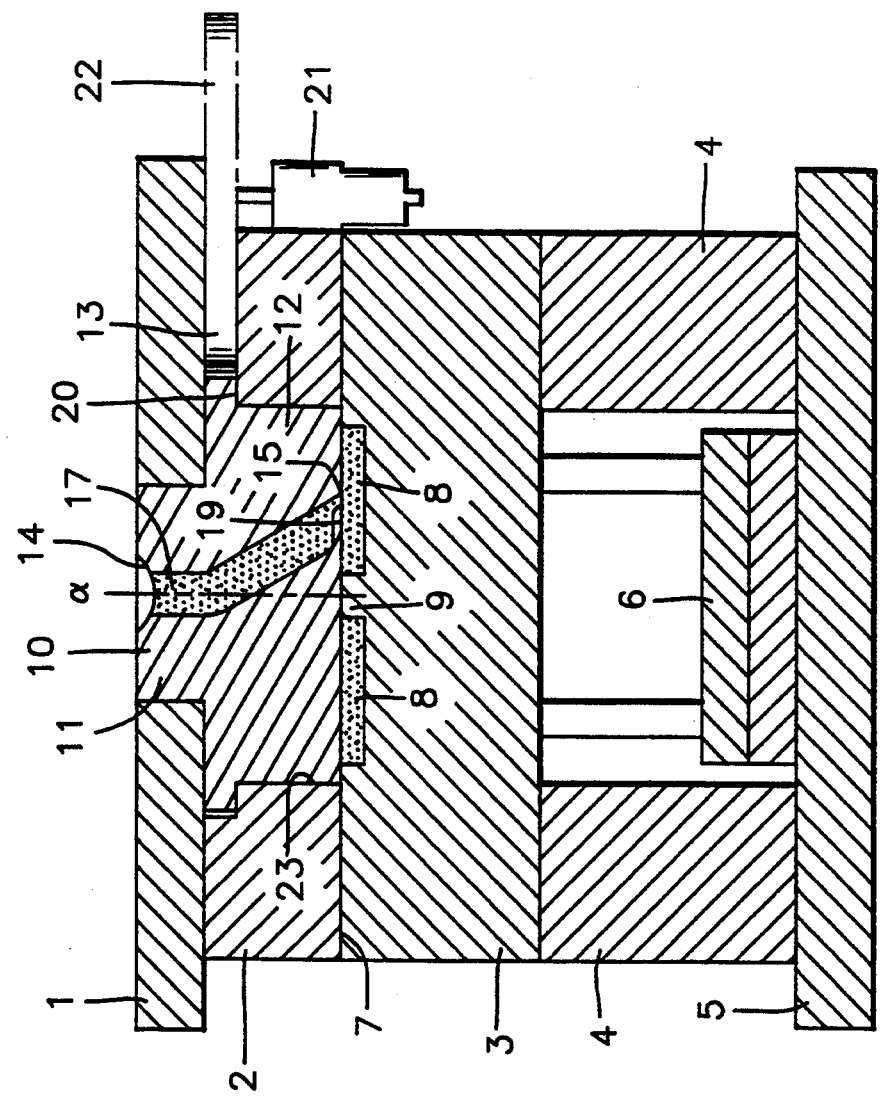
Figure 4:
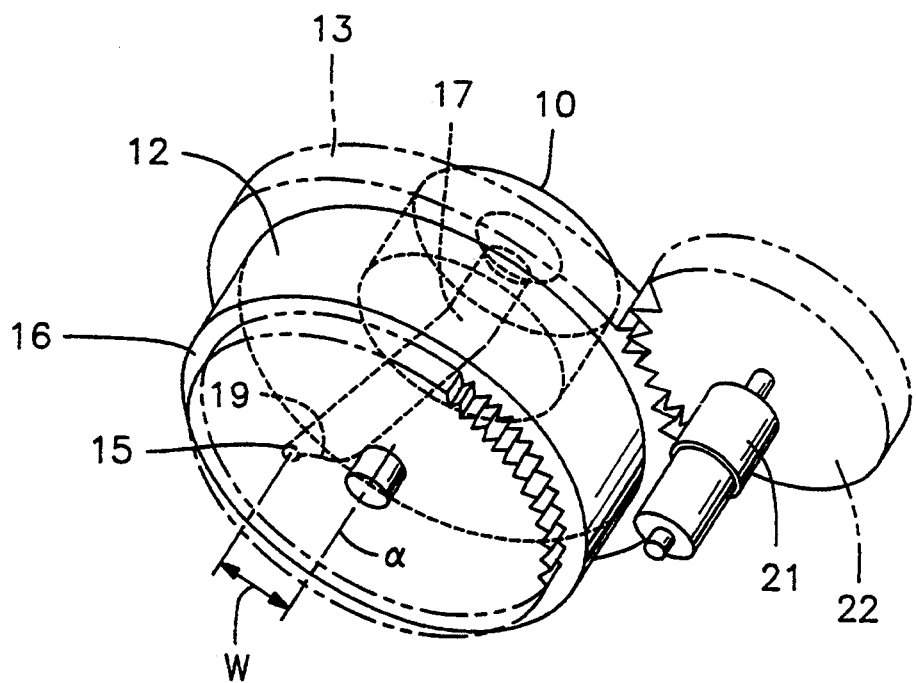
FIG. 4 is a schematic perspective view of a sprue bushing and a gearage of the mold apparatus shown in FIGS. 2 and 3.

In operation, the motor 21 drives the drive gear 22 and thereby rotates the ring gear 13. By rotating the ring gear 13, the sprue bushing 10 is rotated in the bore 23 in either or both of normal and reverse directions. Time to start the operation can be set among times before injection, during injection, and after injection and before setting of the resin. FIG. 3 shows another position of the gate 15 of the sprue bushing 10. As the sprue bushing 10 rotates, the position of the gate 15 rotates about the center axis $\alpha$. Rotation speed of the sprue bushing 10 is determined according to injection speed, the mold structure, article material, and the like. Typically, rotation speed ranges from one fifth or sixth to five or six thousand rotations per a unit time during a period between the start of filling resin and a time before setting of the resin.

Figure 5:
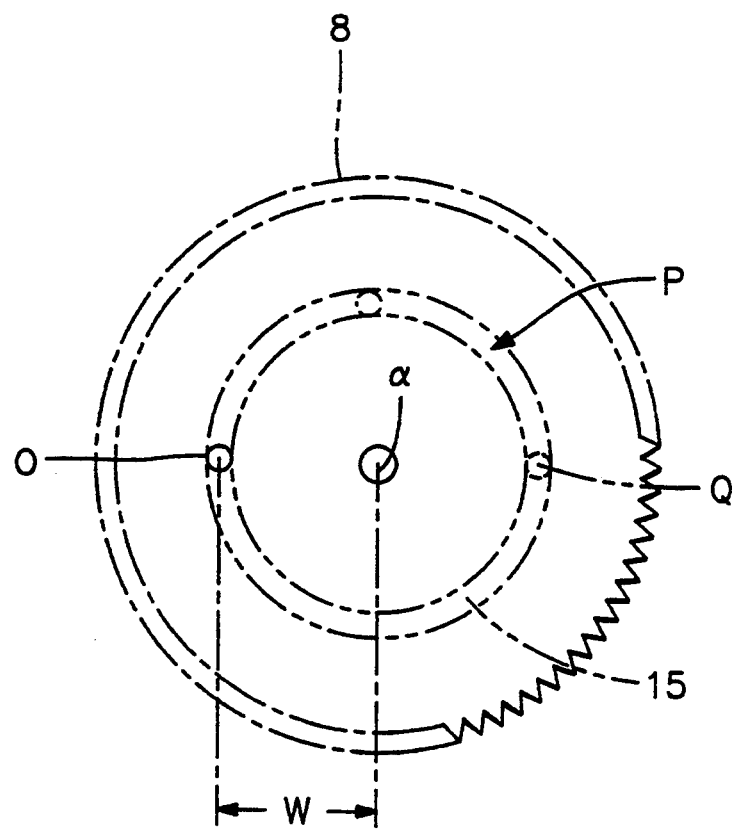
FIG. 5 is a diagram showing a path of an outlet of a passage in the sprue bushing of the molding apparatus shown in FIGS. 2 and 3.

Molten resin is injected through the sprue 17, the curved portion 19, and the gate 15 into each section of the mold cavity 8. During injection, the molten resin flows from the gate 15, which is moving circularly, and the molten resin spreads radially and gradually from the gate 15. FIG. 5 shows the path P of the gate 15 and positions O and Q on the path P. Since the gate 15 moves on the path P continuously, the molten resin flows from every point on the path P, and spreads radially to fill the mold cavity 8.

When the mold halves are held with pressure after the material is charged into the cavity, the material begins to solidify. If the material in the gate is firstly solidified, the rotation of the sprue bushing can be stopped at that time, because the joint between the gate and the mold cavity will separate. In accordance with the structure of the gate, a separation between the gate and the mold cavity is identified as a semi-solid state of the material in which the surface of the material in the cavity appears to be solidified, so that the rotation of the sprue bushing can be stopped at the time that the separation occurs.

When the mold halves are opened, the gate is already cut off, and then, the molded article having no scar of the gate on the surface thereof is pushed out. By using a hot-runner system, not shown, a sequential molding can be done.

According to the molding apparatus, since the sprue bushing 10 has the gate 15 displaced from the center axis $\alpha$, a large predetermined distance W is readily obtained, and therefore, the molding apparatus optimizes molding of an article with a center hole, such as a gear shown in the drawings, thereby eliminating a state of low material density.

Figure 6:
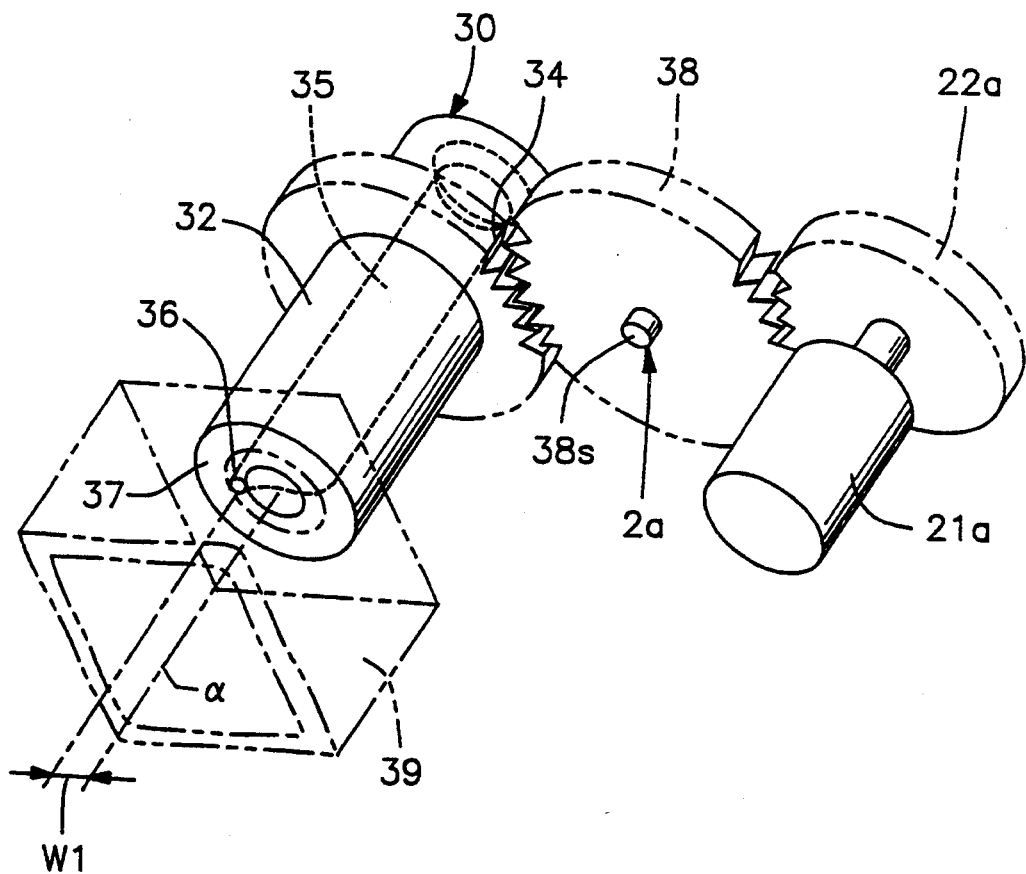
FIG. 6 is a schematic perspective view of a sprue bushing and a gearing of another mold apparatus according to the present invention.

Referring to FIG. 6, another molding apparatus is shown. A sprue bushing 30, as rotary means, includes a cylindrical shaped body 32 extending in the direction of a center axis α and a ring gear 34 fastened to the circumferential periphery of the body 32. The ring gear 34 meshes an intermediate gear 38, a shaft 38s of which is supported by the stationary mold half 2a. A sprue 35 axially extending is arranged within the sprue bushing 30 so as to form a gate 36 at an end face 37 of the sprue bushing 30. The gate 36 opens in a narrow outlet, and is located at a position slightly displaced by a distance W1, in a range of radius of sprue 35, from the center axis α. The intermediate gear 38 meshes a drive gear 22a, which is driven by a motor 21a.

In the molding apparatus shown in FIG. 6, a short distance W1 is readily designed, and therefore, the molding apparatus is able to fill the material to the end of the cavity 39 readily, even if the cavity 39 has a boxed shape as shown, as well as an apparatus having a multiple gate.

Figure 7:
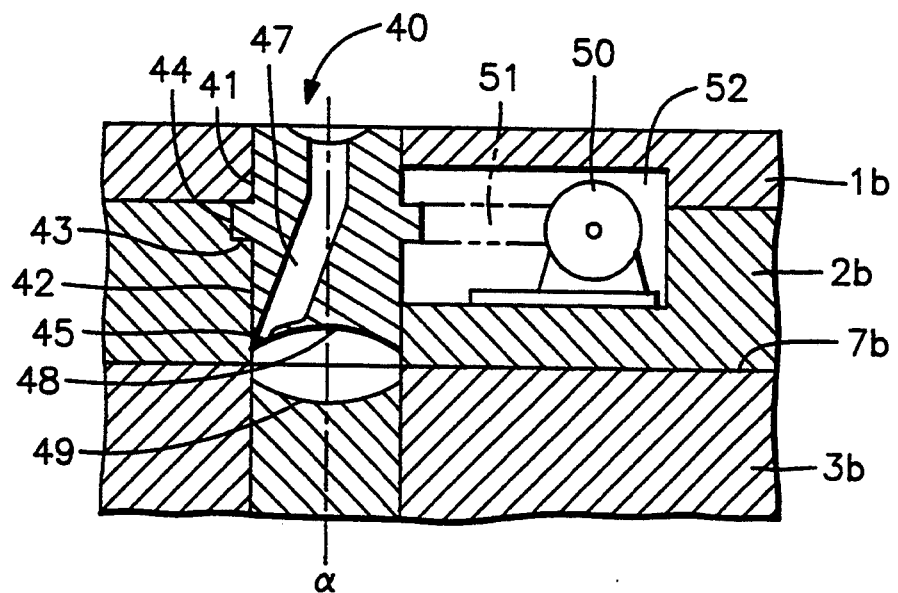
FIG. 7 is a cross-section showing another mold apparatus according to the present invention.

Referring to FIG. 7, another molding apparatus for molding optical lenses is shown. A sprue bushing 40 is rotatablly mounted in a bore 41, which penetrates a stationary platen 1b and a stationary mold half 2b. The sprue bushing 40 has a cylindrical shape and is formed with a ring gear 44 provided at a circumferential periphery thereof. In the sprue bushing 40, a sprue 46 extends along a center axis α from a side of the injection unit, and is bent at its middle toward an edge of an end face 48 of the sprue bushing 40. A gate 45 is opened as an outlet of the sprue 46 at the edge of the end face 48, or at a circumferential edge of the mold cavity 49. The end face is formed in a concave shape so as to form convex optical lenses. An intermediate gear 51 in mesh with the ring gear 44 and an electromagnetic motor 50 for driving the intermediate gear 51 are installed in a hollow portion 52 formed between the stationary platen 1b and the stationary mold half 2b.

In the molding apparatus shown in FIG. 7, since every point of the whole periphery of the mold cavity 49 is used for an outlet of the molten resin, weld lines never occur in the molded article, and therefore, the molding apparatus optimizes molding of optical lens articles.

It is to be noted that although the molding apparatus described above has the ring gear arranged at the periphery of the sprue bushing, another molding apparatus according to the invention can employ a belt or a chain in lieu of the ring gear. In another variation, a ring gear can be formed in a groove on the surface of the sprue bushing, and the sprue bushing, or rotary means, can be formed with other passages for molten resin.

It is finally understood that although preferred embodiments of the invention have been described, various other embodiments and variations may occur to those skilled in the art which fall within the scope and spirit of the invention, and such other embodiments and variations are intended to be covered by the following claims.

What is claimed is:

1. A molding apparatus for molding articles by introducing molten resin into a mold cavity thereof, comprising:
   a stationary mold half;
   a movable mold half capable of moving relative to said stationary mold half so as to come into contact with said stationary mold half to define said mold cavity for forming said article;
   a rotary member mounted in one of said stationary and movable mold halves so as to be rotatable about a center rotation axis of the rotatable member, said rotary member having a passage with a resin inlet located on said center rotation axis, and a gate which opens to said mold cavity located at a position radially displaced from said center rotation axis; and
   drive means for driving said rotary member to rotate about said center rotation axis while filling the molten resin into said mold cavity through said resin passage.

2. A molding apparatus according to claim 1, wherein said passage has a curved portion for discharging molten resin radially outward of said center rotation axis.

3. A molding apparatus according to claim 1, wherein said drive means includes a driven gear fixedly provided around said rotary member and a drive gear meshing with said driven gear provided within said one of said stationary and movable mold halves.

4. A molding apparatus according to claim 3, wherein said drive gear meshes with an intermediate gear provided within said one of said mold halves.

5. A molding apparatus according to claim 3, wherein said drive means further includes a drive motor for driving said drive gear installed within said one of said stationary and movable mold halves.

6. A molding apparatus according to claim 1, wherein said mold cavity is for an article with a center hole thereof.

7. A molding apparatus according to claim 1, wherein said outlet rotates along the periphery of said mold cavity.

8. A molding apparatus according to claim 1, wherein said rotary member is a sprue bushing.

* * * * *